United States Patent
Levinson

(10) Patent No.: US 7,859,071 B2
(45) Date of Patent: Dec. 28, 2010

(54) POWER AND COMMUNICATION INTERFACE FOR SENSORS USING A SINGLE TETHERED FIBER

(75) Inventor: Frank Levinson, Syracuse, IN (US)

(73) Assignee: Finisar Corporation, Sunnyvale, CA (US)

( * ) Notice: Subject to any disclaimer, the term of this patent is extended or adjusted under 35 U.S.C. 154(b) by 1141 days.

(21) Appl. No.: 11/278,067

(22) Filed: Mar. 30, 2006

(65) Prior Publication Data

US 2006/0222302 A1 Oct. 5, 2006

Related U.S. Application Data

(60) Provisional application No. 60/666,903, filed on Mar. 31, 2005, provisional application No. 60/666,906, filed on Mar. 31, 2005, provisional application No. 60/666,905, filed on Mar. 31, 2005.

(51) Int. Cl.
*H01L 31/0232* (2006.01)
*H01L 27/14* (2006.01)
*H01L 31/00* (2006.01)
*H01L 29/417* (2006.01)
*H01L 29/74* (2006.01)
*H01L 31/111* (2006.01)

(52) U.S. Cl. .............. 257/432; 257/116; 257/117; 257/428; 257/E31.001; 257/E33.077

(58) Field of Classification Search ......... 257/116–117, 257/428, 432, E31.001, E33.077
See application file for complete search history.

(56) References Cited

U.S. PATENT DOCUMENTS

| | | | |
|---|---|---|---|
| 4,485,391 A * | 11/1984 | Poulain et al. | 257/80 |
| 5,362,976 A * | 11/1994 | Suzuki | 257/81 |
| 5,434,939 A * | 7/1995 | Matsuda | 385/88 |
| 5,745,030 A | 4/1998 | Aaron | |
| 5,752,976 A | 5/1998 | Duffin et al. | |
| 5,862,803 A | 1/1999 | Besson et al. | |
| 5,864,220 A | 1/1999 | Reipur et al. | |
| 6,074,102 A * | 6/2000 | Oikawa | 385/88 |
| 6,271,766 B1 | 8/2001 | Didden et al. | |
| 6,395,585 B2 * | 5/2002 | Brandl | 438/127 |
| 6,534,705 B2 | 3/2003 | Berrios et al. | |
| 6,568,863 B2 * | 5/2003 | Murata | 385/89 |
| 6,659,659 B1 * | 12/2003 | Malone | 385/94 |

(Continued)

OTHER PUBLICATIONS

"Photonic Power—Isolated Power Delivery Systems", Photonic Power Products: Photovoltaic Power Converters, Photonic Power Modules, Optically Powered Data Link System. http://www.jdsu.com/index.cfm?pagePath=Products/Photonic_Power JDS Uniphase Corporation, Copyright 2006.

(Continued)

*Primary Examiner*—Ida M Soward
(74) *Attorney, Agent, or Firm*—Workman Nydegger

(57) ABSTRACT

A sensing system tethered to an optical fiber for delivering optical power. A sensing system has a semiconductor device that includes photodiodes and a laser. The optical signal delivered through the optical fiber generates a current in the photodiodes that can be used to at least recharge the sensing system's power supply or bias the laser. The optical signal can be modulated to deliver data to the sensing system. The laser can be modulated to transmit data from the sensing system over the optical fiber. Because the power source can be recharged, the sensing system can also transmit and receive using an RF module.

14 Claims, 3 Drawing Sheets

U.S. PATENT DOCUMENTS

| | | | |
|---|---|---|---|
| 6,791,611 B2 | 9/2004 | Yang | |
| 6,807,218 B1 * | 10/2004 | Greenwood et al. | 372/107 |
| 6,840,177 B1 | 1/2005 | Hatteland | |
| 6,889,165 B2 | 5/2005 | Lind et al. | |
| 6,900,509 B2 * | 5/2005 | Gallup et al. | 257/414 |
| 6,942,396 B2 * | 9/2005 | Marion et al. | 385/90 |
| 6,981,804 B2 * | 1/2006 | Jian | 385/88 |
| 6,989,589 B2 | 1/2006 | Hammadou et al. | |
| 7,021,132 B2 | 4/2006 | Nigon et al. | |
| 7,093,986 B2 * | 8/2006 | Scofet et al. | 385/92 |
| 7,178,994 B2 * | 2/2007 | Tourne | 385/89 |
| 7,179,680 B2 * | 2/2007 | Fries | 438/106 |
| 7,244,500 B2 | 7/2007 | Watts et al. | |
| 7,285,834 B2 * | 10/2007 | Leib et al. | 257/414 |
| RE40,416 E * | 7/2008 | Jian | 385/88 |
| 7,531,842 B2 * | 5/2009 | Gormley | 257/81 |
| 2004/0038087 A1 | 2/2004 | Shiue et al. | |
| 2004/0149998 A1 * | 8/2004 | Henson et al. | 257/98 |
| 2004/0178462 A1 * | 9/2004 | Sakaguchi et al. | 257/432 |
| 2004/0208600 A1 | 10/2004 | Guenter et al. | |
| 2005/0017315 A1 | 1/2005 | Hammadou et al. | |
| 2005/0159661 A1 | 7/2005 | Connelly et al. | |
| 2006/0133003 A1 | 6/2006 | Kular et al. | |
| 2006/0180479 A1 | 8/2006 | Sparkes et al. | |
| 2006/0228998 A1 | 10/2006 | Levinson | |
| 2007/0060800 A1 | 3/2007 | Drinan et al. | |
| 2009/0171404 A1 | 7/2009 | Irani et al. | |

OTHER PUBLICATIONS

"Powering Remote Data Links over Fiber", JDSU Uniphase Corporation 2006 http://www.JDSU.com.

"Photonic Power Solutions for Communications Deployments", JDS Uniphase Corporation 2005 http://www.JDSU.com.

"MoteWorks TM" Document Part No. 6030-0001-01 Rev A, Crossbow www.xbow.com.

Crossbow Products: OEM Development Kit; Gateways & Network Interfaces Modules; Processor/Radio Modules; Moteworks Hardware Mote Kits; Sensor/Data Acquisition Modules; Mote Systems; Packaging Solutions; Motes, Smart Dust Sensors, Wireless Sensor Networks. Crossbow Technology, Inc., 2006. http://www.xbow.com/Products/productsdetails/.

"Crossbow Announces Industry First with Open, Integrated Platform to Enable Emerging Wireless Sensor Network Market", San Jose, CA: Dec. 5, 2005. Crossbow Technology, Inc. www.xbow.com.

"Wireless Sensor Network Deployments with Fortune 500 Companies Demonstrate Crossbow's Market Leadership", San Jose, CA: Dec. 5, 2005. Crossbow Technology, Inc. www.xbow.com.

"Industrial Wireless Sensor Networking", Published Jun. 28, 2004, ON World Inc. http://onworld.com/html/industrialwirelesssensor.htm.

"ZigBee Competitive Landscape" Published Apr. 14, 2005. ON World Emerging Wireless Research, ON World, Inc. http://onworld.com/zigbee/.

"Wireless Sensor Networks: Growing Markets, Accelerating Demand", Published Jul. 25, 2005. ON World Emerging Wireless Research, ON World, Inc. http://onworld.com/wsn/wirelesssensors.htm.

"Wireless Sensor Networks Technology Dynamics", Published Jul. 25, 2005, ON World, Inc. http://onworld.com/wsn/wsntechdyn.htm.

"Wireless Sensor Networking for AMR & Submetering", Published Oct. 20, 2004, ON World, Inc. http://onworld.com/html/fwamrsynopsis.htm.

"Wireless Sensor Networks for the Oil & Gas Industry", Published Oct. 11, 2005, ONWorld, Inc. http://onworld.com/wsn/oil&gas.htm.

Specifications 9XStream (900 MHz), 24XStream (2.4 GHz) MaxStream, Inc., 1998-2003.

Specifications for the 9XCite MaxStream, Inc., 2004.

9XTend 900 MHz OEM RF Module Specifications MaxStream, Inc., 2005.

XBee & XBee-PRO 2.4 GHz OEM RF Modules Specifications MaxStream, Inc., 2005.

U.S. Appl. No. 11/278,116, Mailed Date May 21, 2009, Notice of Allowance.

U.S. Appl. No. 11/278,116, Mailed Date Feb. 11, 2009, Notice of Allowance.

U.S. Appl. No. 11/278,116, Mailed Date Sep. 9, 2009, Non-Final Rejection.

U.S. Appl. No. 11/278,117, Mailed Date May 3, 2010, Final Rejection.

U.S. Appl. No. 11/278,117, Mailed Date Sep. 29, 2009, Non-Final Rejection.

U.S. Appl. No. 11/278,117, Mailed Date Jan. 7, 2009, Final Rejection.

U.S. Appl. No. 11/278,117, Mailed Date Jun. 12, 2008, Non-Final Rejection.

U.S. Appl. No. 11/278,117, Mailed Date Nov. 30, 2010, Non-Final Rejection.

* cited by examiner

POWER AND COMMUNICATION INTERFACE FOR SENSORS USING A SINGLE TETHERED FIBER

RELATED APPLICATIONS

This application claims the benefit of:

U.S. Provisional Application Ser. No. 60/666,903 filed Mar. 31, 2005 and entitled SYSTEMS AND METHODS FOR COLLECTING DATA WITH SENSORS;

U.S. Provisional Application Ser. No. 60/666,906 filed Mar. 31, 2005 and entitled POWER AND COMMUNICATION INTERFACE FOR SENSORS USING A SINGLE TETHERED FIBER; and U.S. Provisional Patent Application Ser. No. 60/666,905 filed Mar. 31, 2005 and entitled SENSORS WITH MODULAR ARCHITECTURE;

which applications are incorporated herein by reference.

BACKGROUND OF THE INVENTION

1. The Field of the Invention

The present invention relates to the field of sensors and sensing systems. More particularly, embodiments of the invention relate to systems and methods for powering and communicating with sensors including remote sensors.

2. The Relevant Technology

In general, a sensor is a device that generates an output based on some type of input. Sensors have been developed that can respond to a wide range of inputs including, by way of example, nuclear, electromagnetic, chemical, biological, thermal, and mechanical inputs. The ability to respond to many different types of input has made sensors an important aspect of technology. As a result, sensors are increasingly used in a wide range of activities that include, for example, medicinal purposes, environmental purposes, commercial endeavors, industrial activities and biological functions.

In each of these types of activities, there is a growing dependence on the ability to collect, monitor, and analyze data. Sensors help in this endeavor by facilitating and improving the process of collecting and analyzing the data. Sensors improve the ability to collect and analyze data for several reasons. For instance, sensors are usually able to detect a situation more rapidly than a person can detect the same situation. Sensors can also detect subtle changes as well as detect minute quantities that a person cannot discern. In addition, sensors can be deployed in locations and situations where it is often impractical to deploy people.

The data collected by sensors can be used in various ways. Sensor data can be collected over time to monitor trends or to measure changes over time. For example, traffic patterns are collected with sensors over time before implementing a form of traffic control. Collecting the traffic data over time enables a traffic control system to be more efficient. Sensors can also collect data that can be analyzed and used to make quick decisions. For example, automobiles have multiple sensors that collect information that is used to determine when an air bag should be deployed. Clearly, the air bag should not be deployed unnecessarily but only when an accident occurs. As a result, the data collected by the multiple sensors is analyzed collectively to distinguish, for instance, between a true accident and when someone is simply leaning forward.

While sensors can have a beneficial impact on the ability to collect, monitor, and analyze data, there are some limitations that have not been overcome. Some of these limitations relate, for example, to a sensor's power source and to the sensor's communication abilities. Power and communications are problems because the output of many sensors is often electrical in nature and the ability of a sensor to transmit or receive data is often dependent on the power supply. In some instances, power is achieved usig a photodiode that is separated into various segments. These segments usually connected serially so that the voltages add together. One drawback to this approach is that an optical beam is needed to generate current in the photodiodes. If the optical beam is not properly aligned, a loss of electrical power occurs. In other words, the segment that is aligned the worst limits the overall power. The generated current is limited by the element that is poorly aligned.

In spite of the difficulty of powering sensors and communicating with sensors, an electrical output is often desirable because electrical signals can be easily received and processed by computers. In other words, sensors with an electrical output can more easily communicate its data to a computer for analysis. This assumes, however, that the sensor has sufficient power available to communicate its data. For example, in the case of sensors used to control the deployment of an air bag, power and communication are not limiting issues because the car itself provides a power supply that easily meets the power requirements of the sensors over time. At the same time, the power supply of the car enables the sensors to communicate collected data at any time.

In contrast, there are many sensors that have a limited power supply, such as a battery, and therefore have a limited life. A battery enables a sensor to operate for several years as long as the sensor only collects data intermittently and for short periods of time in order to preserve the power of the battery. In these cases, battery power is often conserved by having the sensor "sleep" when not collecting data. A microcontroller, for example, may only need microamps of current during short periods of time. As a result, the battery and therefore the sensor can have a relatively long life.

Unfortunately, battery life drains much more quickly if the sensor is required to transmit the collected data using the battery. In this case, milliamps of current may be required to transmit/receive data instead of the microamps required to operate a microcontroller. Because the transmission and reception of data drains a battery rather quickly, a burden is created in maintaining the effectiveness of the sensor. In other words, the sensor must be physically retrieved in order to extract the collected data. Someone is also needed to change the battery. There is therefore a need for systems and methods that can overcome the effects of a limited power supply in sensors.

BRIEF SUMMARY OF THE INVENTION

These and other limitations are overcome by embodiments of the invention which relate to sensing systems including systems and method for powering sensors and for communicating with sensors. Embodiments of the invention enable the power supply of a sensing system to be recharged or renewed. Embodiments of the invention also enable the sensing system to transit and/or receive data. The ability to recharge the power supply enables the sensing system to communicate its data more efficiently.

In one embodiment, a sensing system includes a semiconductor device with photodiodes and a laser. The sensing system is also tethered to an optical fiber. Light received over the optical fiber can be incident on the photodiodes to produce a current. The current can be used, for example, to trickle charge a power supply of the sensing system. Thus, one embodiment of the sensing system includes a semiconductor device that enables the sensing system to collect power from incoming light, extract data from the incoming light, and transmit data using a single optical fiber.

The current from the photodiodes and/or the power supply may be used to operate and modulate the laser. The modulated laser light can be transmitted back through the optical fiber for analysis. Advantageously, a sensing system tethered to an optical fiber can be placed in many locations, some of which may be hard to access. The ability to optically provide power to the sensor enhances the ability of the sensing system to operate and communicate without shortening its life due to failure of the power supply. In another embodiment, the sensor can transmit the data using RF transmissions using the battery on the sensor. Over time, the battery can be recharged using the optical power delivered to the sensing system through the optical fiber.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to sensing systems and more particularly to remote sensing systems. Receiving data from remote sensing system conventionally required physically connecting the sensing system to a computer to extract the collected data. Physically connection the sensing system to a computer was performed because remotely transmitting the data consumed too much of the sensing system's internal power supply.

Embodiments of the invention include a modular architecture for a sensing system that includes stackable planes. Each plane can be adapted for specific functionality. As a result, multiple sensor configurations can be selected by swapping out one plane for another. Once the appropriate set of planes are selected for a given application, the planes are assembled into an integrated unit. This is achieved, for example, by bonding the planes together. When the planes are bonded together or otherwise assembled, the various components in the respective planes become electrically connected. This enables interplane communication and permits data collected from the sensors, for example, to be accessible to other components within the structure of the sensing system.

The architecture of the modular sensing systems and the interplane communication also accommodates systems and methods for powering the sensing system or for renewing or recharging a sensing system's power supply. Because the power supply is renewable or rechargeable, the sensing system can both remain in a remote location and also have the ability to transmit/receive data without draining the power supply and consequently shortening the life of the sensing system.

Modular Architecture for a Sensing System

Figure 1:
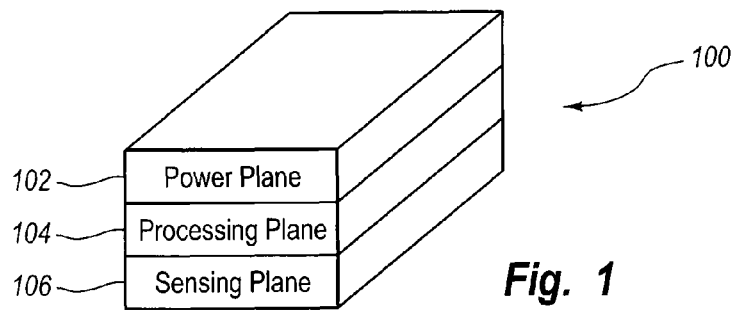
FIG. 1 illustrates one embodiment of a perspective view of a modular sensing system.

FIG. 1 illustrates one embodiment of a sensing system 100. The sensing system 100 is modular and can include multiple planes. The planes of the sensing system 100 are typically independent of each other and can therefore be assembled in different configurations by changing out one plane for another. If one of the planes includes a sensor or a set of sensors, for example, then the capability of the sensing system 100 to collect or monitor data can be changed by simply providing a plane with different sensors. The various planes of the sensing system 100 are stackable and provide interplane communication when assembled together. The interplane communication accommodates different sensor configurations and the like.

Figure 2:
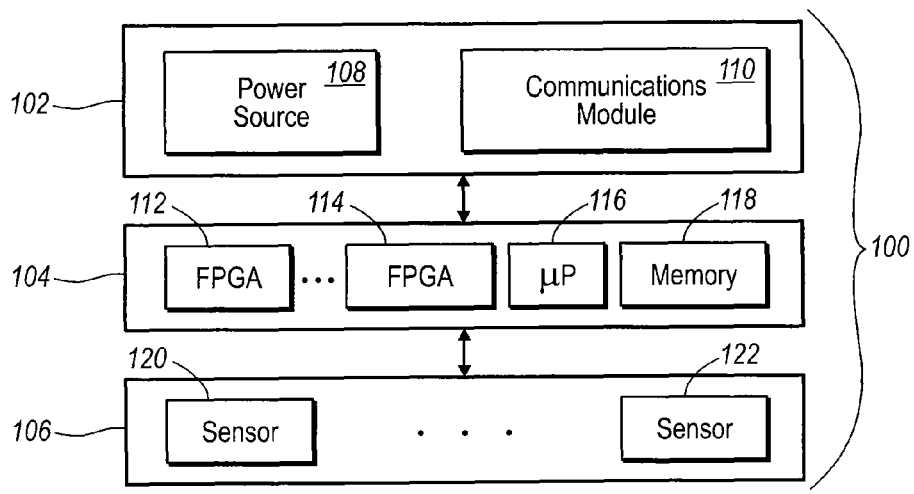
FIG. 2 illustrates examples of planes in a modular sensing system including a power plane, a processing plane, and a sensor plane.

With reference to FIGS. 1 and 2, one embodiment of the sensing system 100 includes a power plane 102, a processing plane 104, and a sensing plane 106. These planes 102, 104, and 106 can be assembled together to form an integrated sensing system 100. The various components within the respective planes can be arranged such that interplane communication is possible even when a new plane is selected for inclusion in a particular sensing system. Additional planes can be added to provide additional functionality or for other reasons such as forming a hermetic seal for the sensing system's components.

The power plane 102 includes components that provide power to the sensing system 100. The power source 108 provides the power required for both the processing plane 104 and the sensing plane 106. The components in power plane 102 may also include a communication module 110 that is powered by the power source 108. In some embodiments, the power source 108 is renewable or rechargeable. A renewable or rechargeable power source 108 enables the communication module 110 to transmit more effectively and with more power because the power source 108 can be recharged. In one example, the sensing system 100 can communicate wirelessly. This facilitates the collection of data in real time or more near real time. Advantageously, data can be collected remotely without having to physically access the sensing system and connect it to another device.

The processing plane 104 may include various combinations of components that are used to process or store the data collected or provided by sensors in the sensing plane 106. In this example, the processing plane 104 includes a microprocessor 116 and associated memory 118. The memory 118 may include volatile (e.g., RAM) and/or nonvolatile memory (e.g., FLASH memory). The nonvolatile memory can be used to store, by way of example, the analyzed or processed sensor data as well as other code executed by microprocessor 116.

One of skill in the art can appreciate that the microprocessor 116 may be implemented as another device such as a microcontroller and the like.

The processing plane 104 may also include one or more field programmable gate arrays (FPGAs). The FPGAs can be either digital or analog in nature and can therefore be configured to perform various tasks. The FPGAs can provide, by way of example and not limitation, analog to digital converters, digital to analog converters, timers, counters, amplifiers, filters, pulse width modulators, and the like or any combination thereof. In one embodiment, the processing plane 104 may include a PSoC™ Mixed Signal Array available from Cypress MicroSystems.

Because the sensing system 100 can receive data remotely, the processing plane can be configured or updated remotely. This enables code stored in the processing plane to be updated or altered. In one embodiment, the sensor can be remotely reprogrammed to perform new or additional functions.

The sensing plane 106 includes one or more sensors that collect data. The data collected by the sensors in the sensing plane 106 can be processed by the processing plane 104 and communicated to a remote location through the communication module 110 provided in the power plane 102. Alternatively, the processed data can be stored in the memory 118 until it is retrieved at a later date either remotely or directly. Sensors that can be included in the sensing plane 106 include, but are not limited to, biological sensors, chemical sensors, physical sensors (temperature, speed, pressure, etc.), electromagnetic sensors, nuclear sensors, and the like or any combination thereof.

Figure 3:
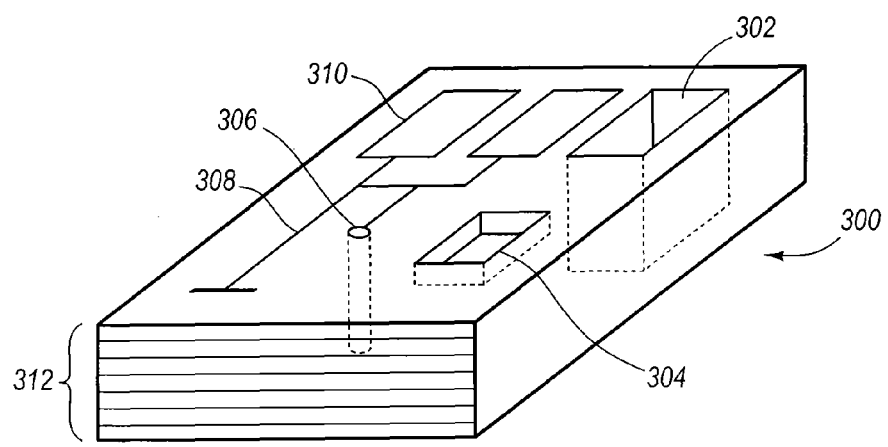
FIG. 3 illustrates one embodiment of a plane that includes multiple layers with cavities for accommodating components that are included in a sensor.

FIG. 3 illustrates an example of a plane 300 that may be included in the sensing system 100. In one embodiment, the plane 300 may be formed from a ceramic material known in the art as "green clay" and may include multiple layers 312. Conductive paths 308 and other components 310 can be located on each of the layers 312. The plane 300 may also include vias 306 that enable electrical communication between the layers 312 as required.

The plane 300 also includes cavities 302 and 304. The cavity 302 passes completely through the plane 300 while the cavity 304 only partially extends into the plane 300. The cavities 302 and 304 may be used to hold various components that may not be an integral part of a particular layer like the conductive paths. The cavities 302 and 304 can hold more bulky components yet still permit the assembled sensor to have a compact and common shape and size if desired.

For example in the plane 104 shown in FIGS. 1 and 2, the FPGA 112 and 114, the microprocessor 116, and the memory 118 may each be placed within a cavity such as the cavity 302 or 304. Various types of connections can be used to connect components placed within the various cavities 302, 304 of the plane 300. Also, placing components within the cavities ensures that the layers remain stackable and can be fabricated in a uniform manner even though the various planes include different components including different sensors.

Figure 4:
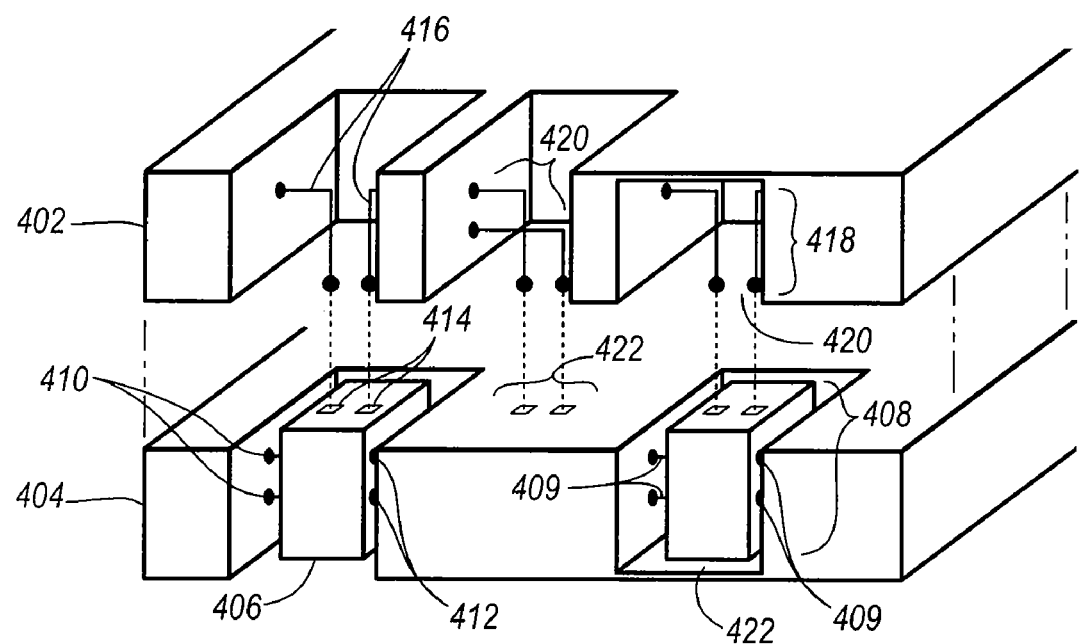
FIG. 4 illustrates one embodiment of electrical connections between planes and an example of a hermetic seal formed by the coupled planes.

FIG. 4 illustrates an example of interplane communication in a sensing system. FIG. 4 illustrates a processing plane 402 and a sensing plane 404 before the planes are integrated or bonded together. The sensing plane 404 includes a sensor 406 and a sensor 408 that are each disposed within a corresponding cavity of the sensing plane 404. The sensor 406 is connected to one or more layers of the sensing plane through the connections 410 and 412. The connections 410 and 412 may include, by way of example, $I^2C$, power, and the like. The sensor 408 has similar connections 409.

The processing plane 402 has leads 416 and 418 that are formed within corresponding cavities of plane 402. In this example, the leads 416 are configured to come into contact with the contacts 414 when the processing plane 402 is connected or bonded with the sensing plane 404. In another embodiment, the leads 420 can contact the contacts 422, which may be connected with one of the sensors 406 and or 408 through various layers of the plane 404.

When the sensing system is fabricated, the various planes are positioned such that the leads in one plane match up with the contacts in another plane. Then, the planes are bonded or otherwise connected together to form a sensing system. During fabrication of the sensing system or of a particular plane when one plane is bonded to another plane, each lead may be secured to a corresponding contact by welding or soldering to ensure a proper electrical contact. Each plane may have an insulation layer to ensure that interplane communication occurs only where specified. The planes can be sealed together to ensure that leads and contacts in respective planes are in adequate contact. Advantageously, some of the components that are placed within cavities of the planes are hermetically sealed. FIG. 4, for example, illustrates that the cavity 420 and the cavity 422 are partial cavities and that the sensor 408 can be hermetically sealed inside the sensor when the planes 402 and 404 are bonded together.

Sensing System Power Source

Some sensing systems typically require a power source such as a battery. The battery, as previously described, has a limited life. Embodiments of the invention, however, deliver optical power to the sensing system that can be converted to an electrical form. The optical power can also be modulated such that both data and power can be delivered to a sensing system on the same optical signal. Data can also be received from the sensing system.

Figure 5:
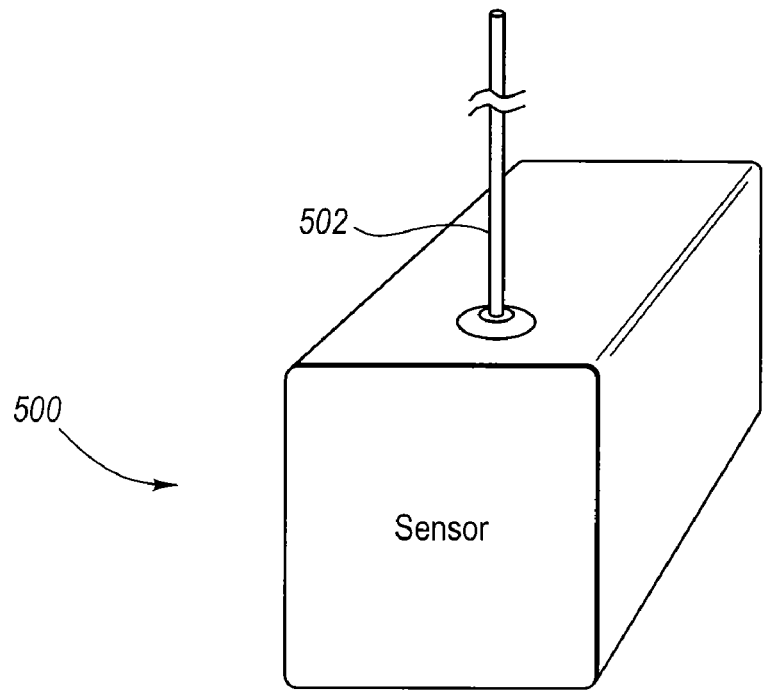
FIG. 5 illustrates one embodiment of a sensing system with a tethered optical fiber.

In one embodiment, an optical fiber is used to deliver the optical power to a sensing system and FIG. 5 illustrates an example of a sensing system tethered to an optical fiber. The sensing system 500 is tethered or coupled with a cable that is an optical fiber 502 in this example. Through the optical fiber 502, optical power can be delivered to the sensing system. The tether enables the sensing system to be placed in a remote location. A person can then interface with the sensing system through the other end of the optical fiber that is typically placed in a more convenient location than the sensing system itself.

The optical power can be converted to electrical power to trickle charge a power source such as a battery, for example. The ability to optically recharge a battery enables the sensing system to transmit and receive data without fear of shortening the life of the sensor as is the case in conventional sensors that only have a limited battery life. The signal used to deliver optical power to the sensing system can also be modulated and thus carry data to the sensor to reprogram or upgrade the capabilities of the sensing system.

The optical fiber 502 further enables the sensing system to be placed in locations where an electrical cable is unsuitable, such as in refineries, petrochemical towers or other places where potential sparks are unwanted. In fact, a tethered sensing system can be used in a variety of environments including, by way of example and not limitation, ocean floors, oil and gas fields, geographic structures such as volcanoes, animal habitats, ecosystems and the like. The sensing system 500, once placed in an environment, can then be accessed through the optical fiber 502 without having to disturb the environment.

Figure 6:
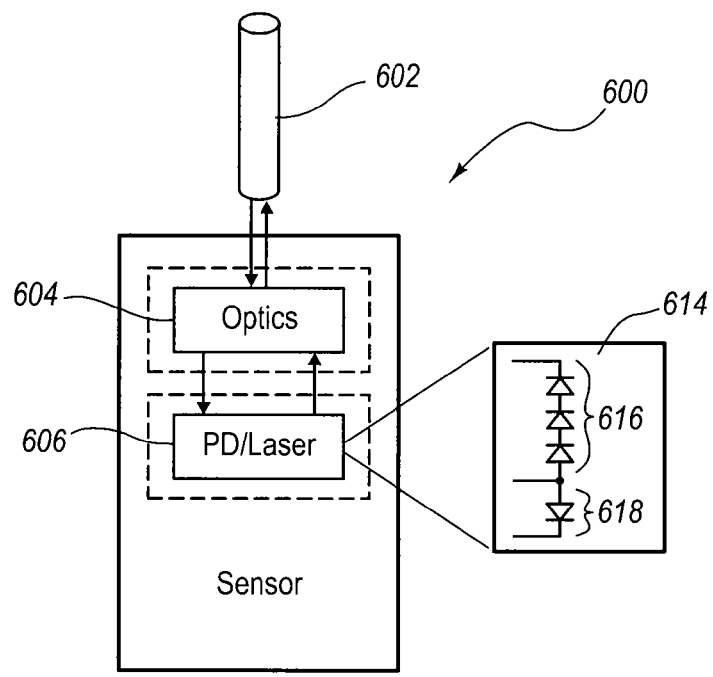
FIG. 6 illustrates one embodiment of a more detailed view of an optical fiber tethered to a sensing system such that optical power can be delivered to the sensing system.

FIG. 6 illustrates another example of a sensing system tethered to an optical fiber. The sensing system 600 includes an optical device 606 that includes both a photodiode and a laser. In this example, the optical device 606 is an integrated semiconductor device that is grown in series. As previously described, the available power in conventional photodiodes that are segmented and serially connected is dependent on the alignment of the optical beam with the segments of the photodiode. The semiconductor device illustrated in FIG. 6 eliminates problems associated with optical alignment. As a result, all of the power generated by the semiconductor device is available for use.

The box 614 illustrates that the optical device 606 includes, in this example, a series of photodiodes 616 and a semiconductor laser 618 grown monolithically. The optical device 606 may also include a transistor that can be turned on/off to control when the laser is active. The transistor may also control the ability to direct the current in the photodiodes to the battery, to the laser, or to other portions of the sensor. This may increase the amount of current available for charging the power supply or for other purposes of the sensor.

In this example, the photodiodes 616 are not biased and the fiber 602 is configured to emit light that is incident on the photodiodes 616. The incident light, under the photovoltaic effect, generates current in the photodiodes 616 that can be used, for example, to charge a battery in the sensor. The voltage generated across the photodiodes by the incident light from the optical fiber 602 may also be used to bias the laser 618, which can be either an edge emitting laser or a vertical cavity surface emitting laser. The laser 618 can be used to transmit data back through the fiber 602. The device 606 therefore enables communication to and from the sensor 600 through a single optical fiber.

The materials selected to fabricate the optical device 606 may be selected based on the associated wavelengths. For example, the photodiodes may be optimized to detect wavelengths on the order of 850 or 980 nanometers. The laser may use a material system optimized to emit light on the order of 1310 or 1550 nanometers. The material system for both the photodiodes and the laser may be the same. Material systems for 850 or 980 nanometers include GaAs and material systems for 1310 or 1550 nanometers include InGaAsP combinations or GaAsAl combinations. One of skill in the art can appreciate that other compositions of semiconductor materials may be used as well. The specific material system selected for the photodiodes and the laser may depend, for example, on the length of the optical fiber. One of skill in the art can appreciate that other material systems may be selected to fabricate the optical device 606. One embodiment of the optical device 606 is further described in U.S. Publication No. US 2004/0208600 A1 and in U.S. Publication No. US 2003/0223756 A1, which are both hereby incorporated by reference.

Thus, the fiber 602 is a single fiber that can be used to optically provide power to the sensing system 600, deliver data to the sensing system 600, and receive data from the sensing system 600. Through the fiber 602, the sensing system 600 can receive data needed to upgrade or reprogram the sensing system. The ability to reprogram or upgrade the sensing system can further be achieved using code stored in the memory of the sensing system.

The optics 604 are configured to direct light emitted from the fiber 602 to the photodiode portion of the device 606 and to direct light emitted by the laser portion of the device 606 back into the laser. As previously stated, the optical power delivered to the sensing system over the fiber 602 can also be modulated to carry data to the sensing system. Changes in the photovoltaic effect can be used to detect the data being delivered to the sensor. In yet another embodiment, the optics 604 may direct the incident light to a transimpedance amplifier used to convert the input optical signal into an electrical signal.

For transmission purposes, the laser light can be modulated by the sensing system itself to send data back through the fiber 602. In some embodiments, the battery power of the sensing system may be used to assist in the reception and transmission of data. The photodiodes, however, can be used to charge the battery at other times when not receiving data to ensure that the sensing system has sufficient power, for example, to collect, receive, transmit, and analyze data.

The sensing system 600 uses stacked diodes, which eliminates the potential for misalignment of the optical beam and ensures that optical power is not limited. Further, the laser included in the stacked diodes or in the semiconductor device can provide alignment for the reverse laser. Full duplex communications can also be achieved.

The semiconductor device 606 as well as the optics 604 can be integrated with the sensing system, for example, by being incorporated into the power plane. Connections to other planes in the sensing system are achieved as previously described.

Figure 7:
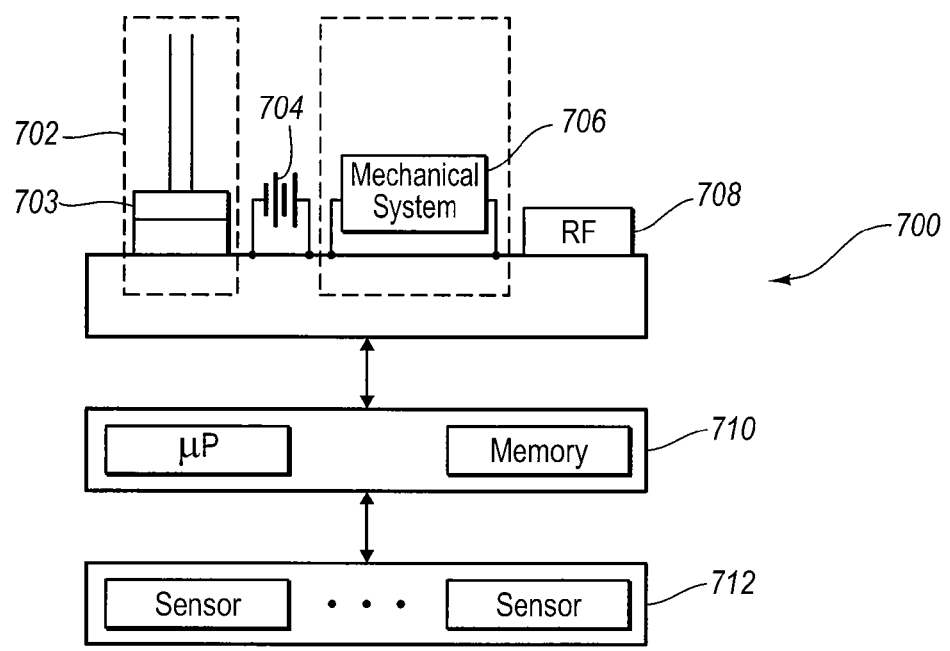
FIG. 7 illustrates multiple examples of components used to provide or recharge power to enable the transmission and reception of data in a sensing system.

FIG. 7 illustrates another embodiment of a sensing system 700 and illustrates additional or alternative power sources. The sensing system 700 includes a tethered fiber 702 that can be used as described previously to communicate with the sensing system 700 as well as provide power for the sensing system 700. The fiber 702, through the photodiodes and laser 703, can charge the battery 704.

The sensing system 700 may also have a mechanical system 706 in addition to or in place of the tethered fiber 702. The mechanical system 706 can be adapted to charge the battery 704. The mechanical system 706 may store energy as the sensing system 700 moves (when connected to a moving object such as an animal or bird) and then discharge the stored energy into the battery when a threshold is achieved. Also, the sensing system 700 may include an RF module 708 for receiving/transmitting data rather than receiving/transmitting data through the fiber 702.

The sensing system described can be made in small sizes. In one embodiment, the sensing system may have a size of less than 1 $cm^3$, although the sensing system can also be smaller or larger. The size of the sensing system may depend on the environment in which the sensing system is deployed as well as the type of sensing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A sensing system comprising:
a first plane having one or more layers with conductive traces formed on at least one layer;
a semiconductor device included in the first plane, the semiconductor device including a plurality of photodiodes and a laser grown monolithically;
a power source included in the first plane, the power source in communication with the semiconductor device; and
an optical fiber tethered with the first plane, wherein the plurality of photodiodes generate a current in response to incident light from the optical fiber.

2. A sensing system as defined in claim 1, wherein the current generated by the plurality of photodiodes charges the power source.

3. A sensing system as defined in claim 1, the semiconductor device further comprising a laser that is driven by at least one of the power source and the current generated in the plurality of photodiodes, wherein data collected by the sensor is transmitted through the optical fiber by modulating an output of the laser.

4. A sensing system as defined in claim 1, wherein the plurality of photodiodes have a material system for responding to a first wavelength and wherein the laser emits a second wavelength.

5. A sensing system as defined in claim 1, further comprising a second plane having one or more layers with conductive traces formed thereon, the second plane in electrical communication with the first plane.

6. A sensing system as defined in claim 5, wherein the second plane further comprises:
   a microprocessor;
   one or more field programmable gate arrays; and
   memory.

7. A sensing system as defined in claim 5, further comprising a third plane having one or more layers with conductive traces formed thereon, the third plane in electrical communication with at least one of the second plane and the first plane.

8. A sensing system as defined in claim 7, wherein the third plane further comprises one or more sensors.

9. A sensing system comprising:
   a semiconductor device mounted in a first plane, wherein the semiconductor device includes:
      a plurality of photodiodes;
      optics; and
      a laser;
   an optical fiber tethered to at least the first plane, wherein the optical fiber is coupled with both the plurality of photodiodes and the laser through the optics such that a modulated optical signal received through the optical fiber is incident on the plurality of photodiodes and light emitted by the laser is launched into the optical fiber, wherein the plurality of photodiodes generate a current in response to the optical signal; and
   a power source that can be recharged using the current generated by the plurality of photodiodes.

10. A sensing system as defined in claim 9, further comprising an optical sub-assembly that demodulates the modulated optical signal to extract data, the data used to either update or reprogram the sensing system.

11. A sensing system as defined in claim 9, further comprising an RF module for transmitting data from the sensing system and for receiving data.

12. A sensing system as defined in claim 9, wherein light emitted by the laser is modulated and transmitted back through the optical fiber.

13. A sensing system as defined in claim 9, wherein the plurality of photodiodes include a material system configured to detect a first wavelength and wherein the laser includes a material system configured to emit a second wavelength.

14. A sensing system as defined in claim 13, wherein the material system of the plurality of photodiodes includes GaAs and the material system of the laser includes GaAsAl and/or InGaAsP.

* * * * *